July 23, 1963   G. A. MAYER   3,098,476
STONE SPLITTER
Filed Jan. 6, 1961   2 Sheets-Sheet 1

INVENTOR.
George A. Mayer
BY
Hovey, Schmidt, Johnson & Hovey
ATTORNEYS.

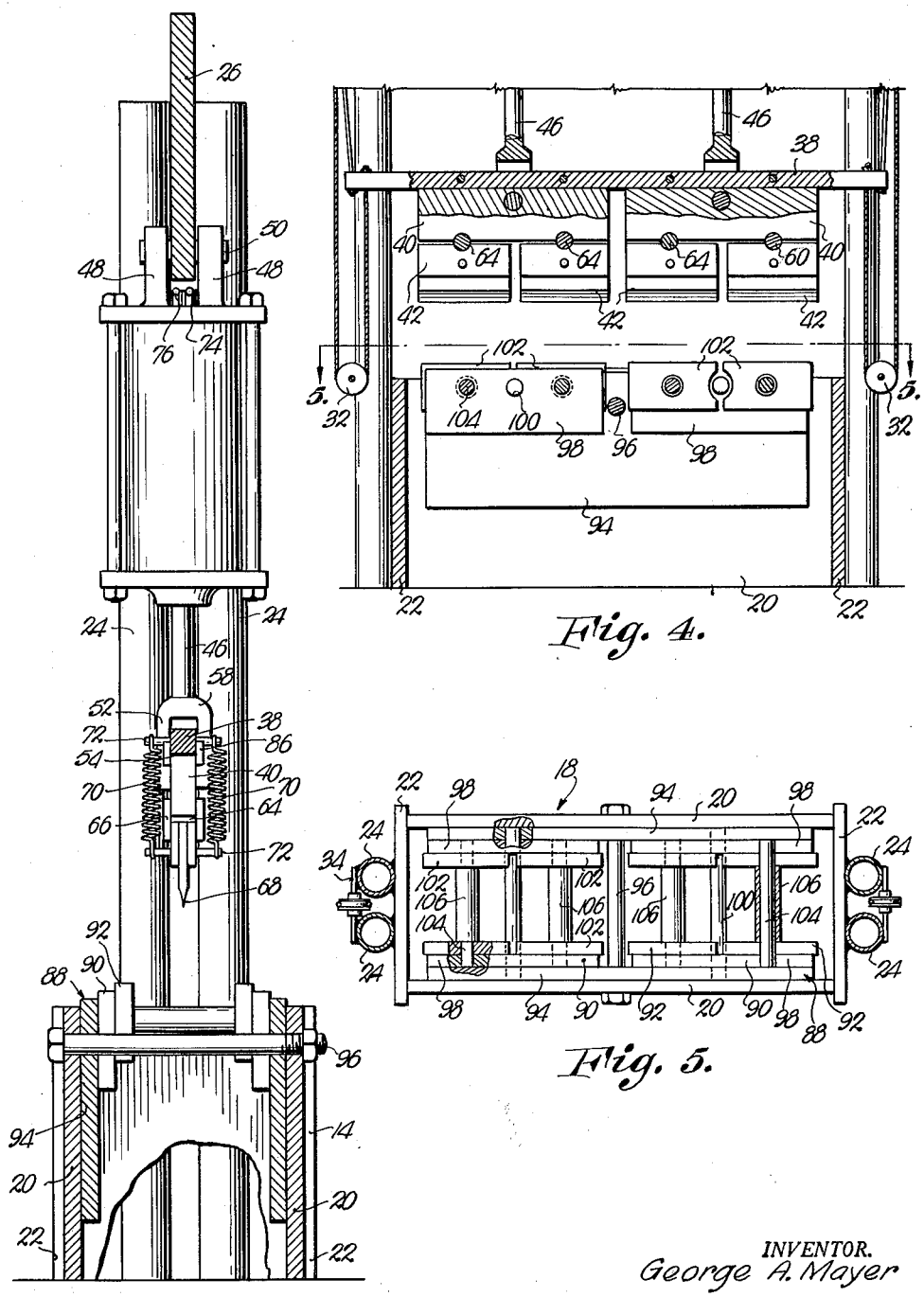

United States Patent Office 3,098,476
Patented July 23, 1963

3,098,476
STONE SPLITTER
George A. Mayer, Miami, Okla., assignor to Miami Stone, Inc., Miami, Okla., a corporation of Oklahoma
Filed Jan. 6, 1961, Ser. No. 81,018
7 Claims. (Cl. 125—23)

This invention relates to apparatus for splitting stones of the type used for building purposes, and more particularly, to machines having pressure equalizing means as a part thereof whereby stones having irregular surfaces may be split along predetermined lines.

The primary object of this invention is the provision of a machine for splitting stones by the application of pressure to the latter along predetermined lines so that the pressure is uniformly distributed along such lines as the stones are uniformly supported to result in the fracturing of the stones along the predetermined lines.

Another object of the instant invention is the provision of a machine for splitting a stone along a predetermined line on the latter so that the fractured stone has an external appearance making it desirable for use in the building trades.

Still another object of the present invention is to provide a stone-splitting machine having a splitting device comprising a plurality of blades which are pivotally mounted so as to align themselves with the surface of the stone against which the same are impressed to provide uniformly distributed splitting action and thereby fracture the stone along a predetermined line.

Yet another object of the present invention is the provision of a stone-splitting machine having as a part thereof, a stone supporting device for equalizing unbalanced pressures on the stone, applied thereto by the splitting means of the machine, so that the stone will be effectively fractured along a predetermined line.

Other objects of this invention include the provision of a plurality of stone-supporting, secondary members pivotally mounted on a primary member, the latter being pivotally mounted on a support so that unbalanced pressures on a stone supported by said secondary members will be equalized by the pivotal action of said primary and secondary members; the provision of a splitting device having a plurality of blades swingably mounted on an hydraulically actuated power mechanism and movable therewith into engagement with a stone to be split; the provision of pivotal means including a pin inserted in milled slots of a blade and an elongated component connected with the power mechanism so that the blade will rock on the pin relative to the component when the same engages an irregular surface of a stone to be split; and the provision of resilient means for maintaining the blades in engagement with the pins about which the blades rock.

This application is a continuation in part of my previously filed application, Serial No. 712,735, filed February 3, 1958, and entitled "Pressure Equalizing Assembly for Stone Breaking Presses," now Patent No. 2,974,661, issued March 14, 1961.

In the drawings:

FIG. 3 is an enlarged, cross-sectional view taken along line 3—3 of FIG. 1;

FIG. 4 is a fragmentary, partially sectional, side elevational view of the stone splitter, illustrating the splitting device and stone-supporting and pressure equalizing means; and FIG. 5 is a sectional view taken along line 5—5 of FIG. 4.

Figures 1, 2:
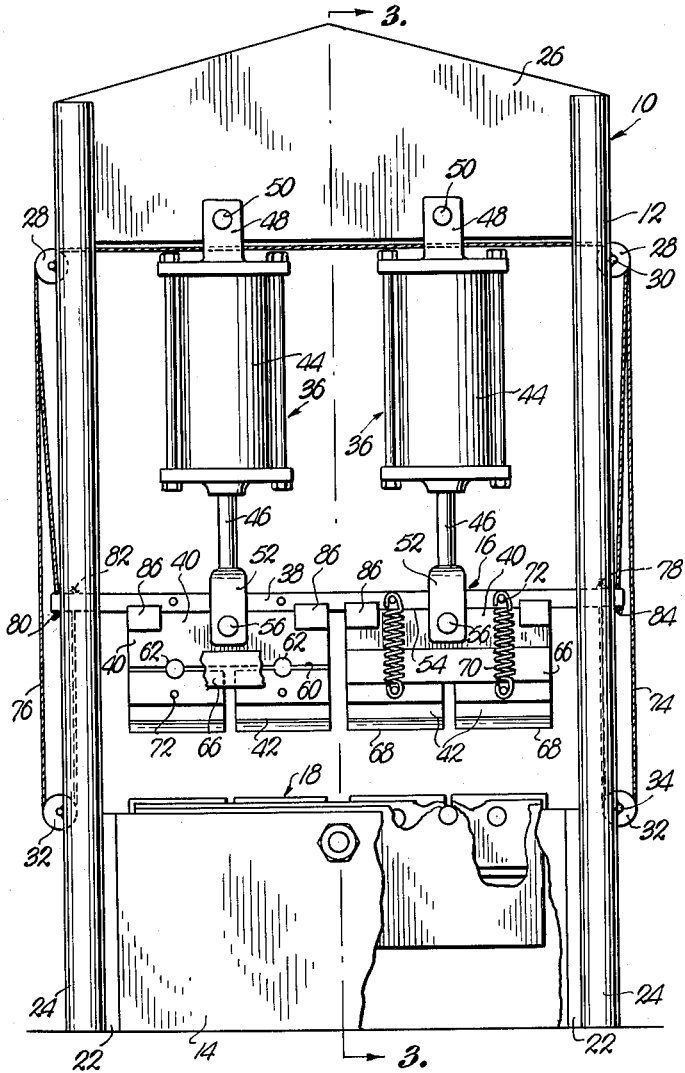
FIGURE 1 is a side elevational view of the stone splitter which is the subject of this invention, parts being broken away to show details of construction.
FIG. 2 is an end elevational view of the stone splitter of FIG. 1.

The stone splitter which is the subject of this invention, is broadly denoted by the numeral 10 and comprises support structure 12, base 14, splitting device 16, and stone-supporting and pressure equalizing means 18.

Base 14 includes a pair of spaced side walls 20 and a pair of end walls 22 secured to side walls 20 at the ends thereof, as is clear in FIG. 5. Base 14 is adapted to be placed upon a surface so that the lower edges of side walls 20 and end walls 22 rest upon the surface. A pair of pipes 24 of rigid material are secured uprightly on each end wall 22 by suitable means, as by welding, and extend upwardly to a point spaced above the upper edges of walls 20 and 22. Pipes 24 are spaced apart to add rigidity to stone splitter 10 and, together with a crossbeam 26 spanning the distance between the uppermost ends of pipes 24, constitute support structure 12 which carries splitting device 16. A pulley system is carried by each set of pipes 24 and includes an upper, double pulley 28 rotatably mounted on a shaft 30 secured to pipes 24 and a lower, single pulley 32 rotatably mounted on a shaft 34 fixed to pipes 24, it being noted that pulley 32 is mounted on pipes 24 proximal to base 14, and upper pulley 28 is mounted on pipes 24 adjacent cross beam 26.

Stone splitting device 16 includes a pair of hydraulically actuated power mechanisms 36 which are operably coupled to a source of hydraulic fluid and to control means (not shown); an elongated bar 38; a pair of components 40 connected to mechanisms 36 and engageable with bar 38; and a pair of splitting blades 42 carried by each component 40. Power mechanisms 36 which include a cylinder 44 within which a piston (not shown) reciprocates, the piston having a push rod 46 extending outwardly from cylinder 44 and downwardly therefrom, as is clear in FIG. 1. Cylinders 44 are each provided with a pair of spaced brackets 48 at the top thereof for receiving the lower marginal edge of crossbeam 26 therebetween so that mechanisms 36 are suspended from crossbeam 26 by virtue of pins 50 inserted in aligned openings in brackets 48 and crossbeam 26.

The lower end of push rods 46 is bifurcated so as to present a pair of spaced arms 52 embracing bar 38 and component 40 proximal to a longitudinal edge 54 of the latter. Arms 52 are secured to components 40 by means of pins 56 inserted through aligned openings in arms 52 and components 40 so that components 40 may pivot relative to their respective supporting arms 52. Bar 38 may shift between the limits defined by the upper longitudinal edges 54 of components 40 and the lowermost surface of bight 58 of the bifurcated ends of push rods 46.

The opposite longitudinal edge 60 of each of components 40 has a pair of milled slots 62 formed therein in spaced relationship, which slots each receive a portion of a corresponding pin 64, it being noted that blades 42 are each provided with a milled slot therein on the upper edge thereof opposite to and in alignment with slots 62 corresponding thereto so that blades 42 may engage their respective pins 64 whereby to permit blades 42 to rock about pins 64 and thereby be shiftable relative to components 40. A pair of spaced guides 66 are provided for maintaining blades 42 in the plane of their respective components 40, guides 66 being secured to components 40 along the lower margin thereof proximal to edge 60. Blades 42 are each provided with a lower cutting edge 68 which is adapted to engage the upper surface of a stone to be split as power mechanisms 36 are actuated to lower push rods 46.

Blades 42 are constantly biased upwardly so that the same are kept in engagement with pins 64 in milled slots 62 of their corresponding components 40 by virtue of elongated coil springs 70 secured at opposite ends thereof to pegs 72 extending outwardly from bar 38 and the respective blades 42, all as is clear in FIG. 3 of the drawings.

A pair of cables 74 and 76 of substantially equal length are connected to bar 38 and pass over pulleys 28 and 32 on each pair of pipes 24 to maintain bar 38 level as the same is forced downwardly under the action of push rods 46 (see FIG. 1). End 78 of cable 74 is secured to one end of bar 38 and passes therefrom downwardly toward one pulley 32, around pulley 32 and upwardly toward one pulley 28, around pulley 28, across the distance between pipes 24, between brackets 48 and beneath the lower edge of crossbeam 26 to the opposite pulley 28, and thence downwardly to the opposite end of bar 38 where it terminates at end 80 secured to bar 38. Cable 76 is provided with a pair of ends 82 and 84 and is disposed over the pulleys in the same manner as cable 74 with the exception that cable 76 is disposed over a separate portion of double pulleys 28 at each end of crossbeam 26. It is clear that, with the cables 74 and 76 attached to bar 38 in this manner, bar 38 will remain substantially horizontal as the same shifts downwardly even if the push rods 46 of power mechanisms 36 are slightly unbalanced so as to impart a greater force to one end of bar 38 than at the other end thereof.

When push rods 46 initially move downwardly, the same force components 40 downwardly and out of engagement with bar 38, the latter being maintained stationary until engaged by the lower surface of bights 58 on the bifurcated ends of push rods 46. While components 40 are out of engagement with bar 38, the same may rock about their respective pins 56 relative to bar 38 in response to an unequal pressure on the respective blades 42 resulting from an irregularity on the surface of a stone to be split. To maintain bar 38 in the same vertical plane as components 40, even when the latter are moved out of engagement with bar 38, a plurality of spaced guides 86 are provided on components 40 proximal to the upper longitudinal edges 54 thereof on either side of the respective pins 56, the guides 86 embracing bar 38, all as apparent from FIGS. 1 and 3.

Stone supporting and pressure equalizing means 18 includes a support 88, a pair of primary members 90 carried by support 88 adjacent each end of the latter, and a pair of secondary members 92 for each of the primary members 90. Support 88 comprises a pair of spaced, plate-like elements 94 pivotally mounted on base 14 between side walls 20 of the latter by virtue of an elongated shaft 96, it being noted that shaft 96 passes through elements 94 substantially midway between the ends thereof. Elements 94 are rockable about an axis through shaft 96 and the upper edges of elements 94 are spaced above the upper edges of side walls 20, as is clear from FIG. 3.

Each of the pair of primary members 90 is comprised of a pair of spaced plates 98 disposed between elements 84 and swingably mounted on the latter by virtue of shafts 100 rigid to plates 98 and journaled in the respective elements 94 of support 88. Plates 98 are thereby rockable about an axis through shaft 100 so that primary member 90 is rockable relative to support 88. Plates 98 have the upper edges thereof spaced above the upper edges of elements 94.

Each plate 98 carries a similar pair of secondary members 92 in the form of spaced plates 102. Corresponding plates 102 of opposed secondary members 92 are interconnected by means of shafts 104 rigid to plates 102 and journaled in the corresponding plates 98 so that each plate 102 is rockable about an axis through the corresponding shaft 104 relative to the corresponding primary member 90. The upper edge of each of plates 102 is spaced above the upper edge of the first plate 98 adjacent thereto. A sleeve 106 surrounds each shaft 104 so as to maintain plates 102 in spaced-apart relationship. The upper edges of plates 102 combine to provide support for a stone to be split and it is clear that the same provide a two-point system of supporting the stone whereby the stone is supported on either side of a predetermined splitting line.

By virtue of the construction of stone supporting and pressure equalizing means 18, shafts 100 and 104 lie substantially in the same horizontal plane and any movement of secondary members 92 and primary members 90 necessary to conform to any uneven stone surface is movement perpendicular to a line passing transversely through shafts 100 and 106 and is also perpendicular to the surface of the stone to be split.

In operation, a stone to be split is placed upon the upper edges of plates 102 and beneath the edges 68 of blades 42. Upon actuation of power mechanisms 36, push rods 46 are lowered so as to bring edges 68 of blades 42 in contact with the upper surface of the stone to be split and, since the edges 68 are maintained in alignment by virtue of bar 38 and components 40, edges 68 engage the upper surface of the stone along a predetermined line where it is desired to split the stone. Pressure is maintained on push rods 46 and thereby blades 42 until the actual splitting of the stone occurs, whereupon push rods 46 are retracted within the respective cylinders 44 to raise blades 42 to the initial positions thereof.

With the two-point suspension system provided by the equalizing means 18, the application of pressure from above by blades 42 on the upper surface of the stone to be split applies more of a braking action rather than a cutting action to give a uniquely textured, broken surface on the stone rather than a smooth surface, the broken surface being more suitable in an esthetic sense for use in the building trades.

Having thus described the invention what is claimed as new and desired to be secured by Letters Patent is:

1. In a stone splitter, a pressure equalizing device comprising a hollow base; a support including a pair of spaced, elongated plate elements; first shaft means pivotally mounting said plate elements within said base for vertical rocking movement relative to the latter; a pair of horizontally spaced primary members; second shaft means pivotally mounting said primary members on said support between said elements for vertical rocking movement relative to the latter; a pair of horizontally spaced secondary members for each primary member; third shaft means pivotally mounting said secondary members on corresponding primary members for vertical rocking movement relative thereto, said secondary members projecting upwardly from the corresponding primary member to provide stone supporting surfaces for engaging a stone along two spaced lines, the axes of pivotal movement of said primary and secondary members being substantially coplanar.

2. In a stone splitter as set forth in claim 1, wherein said base is provided with a pair of side walls, said elements being disposed between the side walls of said base, said primary members each comprising a pair of spaced first plates between the elements of said support, said secondary members each comprising a pair of spaced second plates between the first plates of the corresponding primary member, each of said second plates having an upper marginal edge thereon providing a stone-supporting surface spaced above the upper marginal edge of the corresponding first plate.

3. In a stone splitter, support structure adapted to be disposed above a stone to be split; stone splitting means including at least a pair of blades adapted to engage said stone; power-actuated means including a pair of elongated, reciprocating push rods mounted on said support and secured at proximal ends thereof to corresponding blades for moving the latter downwardly into engagement with the stone, said blades being swingable relative to said moving means about axes substantially normal to the direction of movement of said last-mentioned means; bar means carried by said push rods for maintaining said proximal ends of the latter in the same horizontal plane after the push rods have moved downwardly a predetermined distance; and a stone-supporting and pressure equalizing device mounted below said structure and said blades and including a hollow base, a support including a pair of spaced, elongated plate elements pivotally mounted within said base for vertical rocking movement relative to the latter, a pair of horizontally spaced primary members pivotally mounted on said support between said elements for vertical rocking movement relative to the latter, and a pair of horizontally spaced secondary members for each primary member and mounted on the corresponding primary member for vertical rocking movement relative to the latter, said secondary members having upper marginal edges projecting upwardly from the upper marginal edges of said primary members for providing stone-supporting surfaces, the axes of rocking movement of said primary and secondary members being substantially coplanar.

4. In a stone splitter, a pressure equalizing device comprising a hollow base provided with a pair of side walls; a support including a pair of spaced, elongated plate elements normally disposed between the side walls of said base; a central shaft rigid to said plate elements and journalled in the side walls of the base substantially midway between the ends thereof to mount said elements on said side walls for vertical pivotal movement relative to the latter; a pair of spaced first plates normally disposed between said elements on each side of the central shaft; a pair of first shafts each rigid to a corresponding pair of first plates and journalled in the elements of said support to mount said first plates on said elements for vertical pivotal movement relative thereto; a pair of spaced second plates normally disposed between corresponding first plates on each side of the corresponding first shaft; a second shaft for each pair of spaced second plates and rigidly secured thereto, said second shafts being journalled in the corresponding first plates to mount said second plates on said first plates for vertical pivotal movement relative thereto, each of said second plates having an upper marginal edge providing a stone-supporting surface spaced above the upper marginal edge of the corresponding first plate, the axes of pivotal movement of said plates being substantially coplanar and the plane of said first and second shafts being proximal to and above the horizontal plane of said central shaft.

5. In a stone splitter, support structure adapted to be disposed above a stone to be split; stone splitting means including a pair of blades adapted to engage said stone; an elongated component having opposed upper and lower longitudinal edges; power actuated means including a pair of elongated, reciprocable push rods mounted on said support and pivotally secured at proximal ends thereof to said component, said blades being pivotally mounted on the lower edge of said component for swinging movement relative thereto about horizontal axes and movable therewith under the influence of said push rods; and bar means carried by said push rods and engageable with the upper edge of said component when said push rods have moved downwardly through a predetermined distance for maintaining the proximal ends of the push rods in the same horizontal plane after said push rods have moved downwardly through said predetermined distance.

6. In a stone splitter as set forth in claim 5, wherein is included a pin interposed between each of said blades and the lower edge of the component; and resilient means connected to said bar means and said blades for yieldably maintaining the blades in engagement with said pins as said blades swing relative to the latter.

7. In a stone splitter, support structure adapted to be disposed above a stone to be split; stone splitting means including a pair of blades adapted to engage said stone; power actuated means including a pair of elongated, reciprocable push rods mounted on said support and secured at proximal ends thereof to corresponding blades respectively for moving the latter downwardly into engagement with the stone, said blades being swingable relative to said moving means about horizontal axes substantially normal to the direction of movement of said last mentioned means; an elongated bar having a longitudinal axis substantially parallel with the longitudinal axes of said blades; and cable structure shiftaby secured to said support structure and coupled with the ends of said bar for mounting the latter on said support structure for vertical reciprocation and for maintaining the bar in a horizontal position as the bar reciprocates under the influence of said push rods.

References Cited in the file of this patent

UNITED STATES PATENTS

| 2,557,098 | Graham | June 19, 1951 |
| 2,753,861 | Bode | July 10, 1956 |
| 2,974,661 | Mayer | Mar. 14, 1961 |

FOREIGN PATENTS

| 830,473 | Germany | Feb. 4, 1952 |